United States Patent
Ainasoja et al.

(10) Patent No.: US 9,530,034 B2
(45) Date of Patent: Dec. 27, 2016

(54) APPARATUS COMPRISING A READER AND METHOD FOR CONTROLLING THE READER

(75) Inventors: Teemu Ainasoja, Turku (FI); Jorma Lalla, Littoinen (FI)

(73) Assignee: NORDIC ID OY, Salo (FI)

(*) Notice: Subject to any disclaimer, the term of this patent is extended or adjusted under 35 U.S.C. 154(b) by 214 days.

(21) Appl. No.: 14/007,070

(22) PCT Filed: Mar. 22, 2012

(86) PCT No.: PCT/FI2012/050292
§ 371 (c)(1),
(2), (4) Date: Nov. 15, 2013

(87) PCT Pub. No.: WO2012/127120
PCT Pub. Date: Sep. 27, 2012

(65) Prior Publication Data
US 2014/0062673 A1    Mar. 6, 2014

(30) Foreign Application Priority Data
Mar. 24, 2011   (FI) .................................... 20115286

(51) Int. Cl.
*H04Q 5/22*    (2006.01)
*G06K 7/10*    (2006.01)
(Continued)

(52) U.S. Cl.
CPC ......... *G06K 7/10366* (2013.01); *G06K 7/1091* (2013.01); *G06K 7/10544* (2013.01);
(Continued)

(58) Field of Classification Search
CPC ............ G06K 7/10366; G06K 7/10544; G06K 7/10861; G06K 7/1091; G06Q 10/08; G06Q 50/28
(Continued)

(56) References Cited

U.S. PATENT DOCUMENTS 5,491,346 A * 2/1996 Sussmeier ............... 250/568
6,378,684 B1 * 4/2002 Cox ............................. 194/213
(Continued)

FOREIGN PATENT DOCUMENTS

| WO | 2008044207 | 4/2008 |
|---|---|---|
| WO | 2010120402 | 10/2010 |
| WO | 2010124107 | 10/2010 |

OTHER PUBLICATIONS

International Search Report dated Aug. 14, 2012, corresponding to PCT/FI2012/050292.
(Continued)

*Primary Examiner* — Travis Hunnings
(74) *Attorney, Agent, or Firm* — Young & Thompson

(57) ABSTRACT

A portable device (10, 20) includes at least a control element (14, 24, 34) for receiving command signals and a reader (12, 22, 32). A detection element (18, 28, 38) is connected with the control element (14, 24, 34) and they communicate with each other. Operation of the reader (12, 22, 32) in relation to the object to be identified is controlled through command signals so that at least one of the command signals received by the control element (14, 24, 34) is based on information indicating movement or position received from the detection element (18, 28, 38). The reader (12, 22, 32) is easy to use and quick to operate in its operating environment as no separate actions are required of the user in order to initiate operations.

20 Claims, 3 Drawing Sheets

(51) Int. Cl.
*G06Q 10/08* (2012.01)
*G06Q 50/28* (2012.01)

(52) U.S. Cl.
CPC ......... *G06K 7/10861* (2013.01); *G06Q 10/08* (2013.01); *G06Q 50/28* (2013.01)

(58) Field of Classification Search
USPC ........... 340/10.1, 10.3, 10.4, 10.51; 235/382, 235/385, 439, 455, 462.45, 470, 472.01, 472.02
See application file for complete search history.

(56) References Cited

U.S. PATENT DOCUMENTS

| | | | |
|---|---|---|---|
| 7,667,573 B2* | 2/2010 | Ehrman et al. | 340/10.1 |
| 8,281,994 B1* | 10/2012 | Wass et al. | 235/385 |
| 8,587,432 B2* | 11/2013 | Mulla | 340/572.1 |
| 8,660,483 B2* | 2/2014 | Tsuchida et al. | 455/13.3 |
| 8,681,005 B2* | 3/2014 | Austin et al. | 340/572.4 |
| 2001/0045465 A1* | 11/2001 | Schmidt et al. | 235/462.45 |
| 2002/0023960 A1* | 2/2002 | Knowles et al. | 235/472.01 |
| 2002/0077710 A1* | 6/2002 | Harrington et al. | 700/13 |
| 2003/0222150 A1* | 12/2003 | Sato et al. | 235/472.02 |
| 2004/0004577 A1* | 1/2004 | Forster | 343/866 |
| 2005/0280530 A1* | 12/2005 | Lizza | 340/539.12 |
| 2006/0202803 A1* | 9/2006 | Yoon et al. | 340/10.4 |
| 2007/0109128 A1* | 5/2007 | Fujii | G01S 5/12 340/572.1 |
| 2008/0086391 A1 | 4/2008 | Maynard et al. | |
| 2008/0142590 A1* | 6/2008 | Ainasoja | 235/385 |
| 2008/0223935 A1* | 9/2008 | Marty et al. | 235/470 |
| 2008/0265023 A1* | 10/2008 | Nassimi | 235/382 |
| 2008/0283599 A1* | 11/2008 | Rasband et al. | 235/439 |
| 2008/0309461 A1* | 12/2008 | Mizuki et al. | 340/10.1 |
| 2009/0012667 A1* | 1/2009 | Matsumoto et al. | 701/26 |
| 2010/0258618 A1 | 10/2010 | Philbrick et al. | |
| 2010/0277280 A1* | 11/2010 | Burkart et al. | 340/10.1 |
| 2010/0277283 A1* | 11/2010 | Burkart et al. | 340/10.3 |
| 2010/0277285 A1* | 11/2010 | Anderson et al. | 340/10.4 |
| 2011/0084807 A1* | 4/2011 | Logan et al. | 340/10.1 |
| 2011/0095892 A1* | 4/2011 | Hong et al. | 340/572.7 |
| 2011/0199211 A1* | 8/2011 | Campero et al. | 340/572.1 |
| 2012/0161967 A1* | 6/2012 | Stern | 340/572.1 |
| 2012/0199655 A1* | 8/2012 | Fukuba | 235/455 |
| 2013/0285794 A1* | 10/2013 | Hansen | 340/8.1 |

OTHER PUBLICATIONS

Finnish Office Action dated Jan. 20, 2012, corresponding to the Foreign Priority Application No. 20115286.

* cited by examiner

APPARATUS COMPRISING A READER AND METHOD FOR CONTROLLING THE READER

The invention is directed to a portable device comprising a reader and detection means connected thereto for generating command signals to control the operation of the reader, a device to be attached to a limb comprising a detection means for generating and transmitting command signals, and to a method for generating and receiving command signals controlling the operation of a reader.

BACKGROUND OF THE INVENTION

For the purposes of monitoring, data collection or handling, an identification label is attached to a product or other object, and the data on the ID label are read using e.g. a portable reader device such as a data collecting terminal.

In prior-art devices, the read operation in the reader device is usually initiated by pushing the appropriate button on the reader device, which button may be trigger-shaped, for example. The user either keeps the button depressed for the whole duration of the read operation, or the read operation is programmed to remain active for a predetermined time after the user has pressed the button. It is awkward for the user if he must press the push-button of the reader device in order to initiate the read operation. For example, when picking products from storage for transportation and when distributing products during transportation, it is more convenient for the user that his hands are free for handling boxes and goods instead of having to constantly press the reader push-button or key with his finger to start and/or stop the read operation.

It is also known from prior art that the user may start the reader device by giving a voice command through a microphone in the reader device to a voice recognition unit so that the read operation starts in the read unit in a known manner. Even though a voice command system frees the operator's hands, he must be careful all the time so that the voice commands are correctly given and at the right moment in relation to the positions of the reader device and the object to be read. For example, when handling goods, boxes and other such objects during a collection and packaging process, the user must not let his senses relax at any point of the read operation so that the process progresses smoothly and without errors.

Especially during an inventory, a great number of various product codes has to be read so that starting the read operation through a push-button or voice command becomes very laborious and the worker may start to feel tired in the middle of the operation. Special operations such as pressing the start button or giving a voice command slow down the progress of inventory, collection and packaging processes.

A radio-frequency (RF) reader device is capable of reading the RF signals of RF ID tags (antenna and transceiver circuit) on objects located within its reading range also without specifically starting a read operation through a push-button or voice command. Then, however, the RF reader device reads all the RF signals of the objects within its reading range whereby the operator of the reader device cannot in any way direct the read operation to certain desired goods or objects only. In inventory, collection and packaging processes as well as in distribution and other goods handling applications it is specifically important that the objects to be read can be selected as desired.

SUMMARY OF THE INVENTION

An object of the invention is to eliminate the drawbacks mentioned above and to introduce a device in which the operation of the reader device can be activated automatically, without the user having to keep in mind a special action when he wants to activate a function of the reader device. Such a special action could be e.g. the pressing of a push-button or key on the device or giving a voice command to activate operation of the reader device. According to the invention the reader is automatically activated when a given reader operation is to be carried out.

In order to achieve this objective, a device according to the invention comprises a control means for receiving command signals and a reader the operation of which is controlled by said command signals in relation to the object to be identified, whereby at least one command signal received by said control means is based on information indicating movement or position received from a detection means.

In order to achieve this objective, a device according to the invention attachable to a limb or body comprises at least a detection means to generate command signals and transmit them to the control means or at least a reader and control means whereby at least one command signal received by said control means is based on information indicating movement or position received from the detection means and whereby said command signals control the operation of the reader in relation to the object to be identified.

In order to achieve this objective, a method according to the invention for controlling a reader comprises steps to receive information indicating movement or position of a detection means or object to be identified, generate command signals based at least in part on the received information indicating movement or position, and to control through at least one of said control signals the operation of the reader as desired in relation to the object to be identified.

In one advantageous embodiment, a detection means connected to the control means of the device detects movement, position or distance, and the detection means is adapted to generate and transmit information which indicates the movement or position of the detection means or the object to be identified.

In an advantageous embodiment the device is a device to be held in the user' hand, a device to be attached to the user's wrist, or a device to be attached onto the user's waist.

In an advantageous embodiment the device comprises a separate unit containing a detection means and a portable device comprising at least a reader and control means, whereby the detection means are connected, in a wired or wireless manner, to the control means for data transmission.

For example, a sensor unit is attached to the users wrist to function as a wrist device and the reader device is carried on the user's hand or belt whereby the wrist device and the reader device, such as a hand or belt reader, communicate with each other.

In one advantageous embodiment, the action of the reader in the device in relation to the object to be identified may be one or more of the following: reading, writing, locking or disabling one or more identifiers on the object or some other predetermined operation on the identifier.

In one advantageous embodiment, data transfer between the reader in the device and identifier on the object to be identified may be based on transmission and reception of a radio signal, transmission and reception of an optical signal, or transmission and reception of some other wired or wireless signal.

A method according to an advantageous embodiment comprises steps in which at least one of the following actions is carried out in relation to the object to be identified: read from one or more identifiers on the object, write to one or more identifiers on the object, lock one or more identifiers on the object, disable one or more identifiers on the object, or direct some other operation to one or more identifiers on the object.

An advantage of the invention is that the user does not need to continuously monitor how the read or other operation progresses, but the reader will be automatically activated according to the situation when a read or other operation is to be carried out.

Another advantage of the invention is that the device is quicker and easier to use in many practical situations such as e.g. when making an inventory of products or other objects and in product collection, packaging and distribution processes.

In inventory, collection and packaging processes as well as in distribution and other goods handling applications it is important that the objects to be acted on can be selected individually and in the desired manner.

BRIEF DESCRIPTION OF THE DRAWINGS

The invention will now be described in more detail, referring to the accompanying drawings, where.

DETAILED DESCRIPTION OF THE INVENTION

Figure 1:
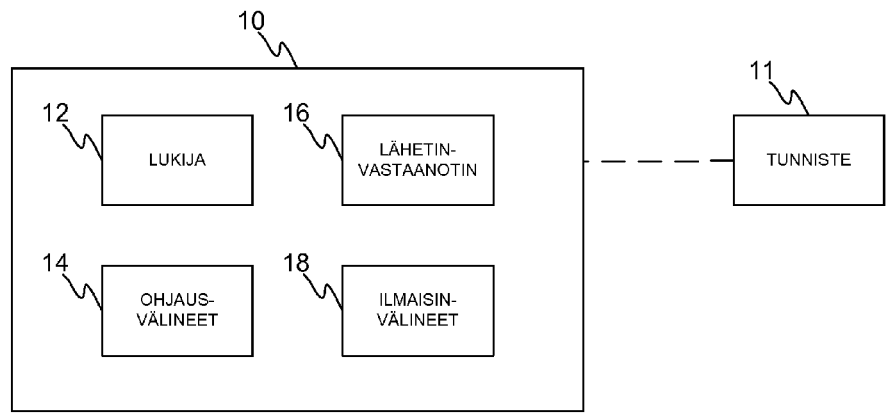
FIG. 1 shows a device according to an example of the invention.

A portable device 10 shown in FIG. 1 according to an example comprises a reader unit 12 and a transceiver 16, such as an antenna, for example, which is connected therewith and communicates with an identifier 11, such as an identifier tag containing an optical or RF transmitter or transceiver, on the object to be identified. The transceiver 16, such as an antenna, communicates with the reader unit 12 in a manner known as such. In addition, the portable device 10 comprises a control means 14 at least for controlling the operation of the reader unit 12 in a desired manner in relation to the object to be identified. Furthermore, the portable device 10 comprises a detection means 18, such as a sensor, for detecting and indicating movement, position or distance. The detection means 18 generate information indicating movement or position of the detection means 18, and/or information indicating movement or position of the object to be identified. The detection means 18 is adapted to transmit this information to the control means 14 in a wireless or wired manner. The control means 14 is adapted to receive command signals for controlling the operation of the reader unit 12 in relation to the object to be identified, wherein one or more of the command signals is/are based on the information indicating movement or position of the detection means 18 and/or the object to be identified.

The portable device 10 which is shown in FIG. 1 as an example may be a handheld terminal or it may be attached to the users limb or body. According to one example, the device 10 is a wrist device which can be attached to the user's wrist in a manner similar to a wristwatch. According to another example, the device 10 is a belt device which can be attached to the user's belt, for instance.

Figure 2:
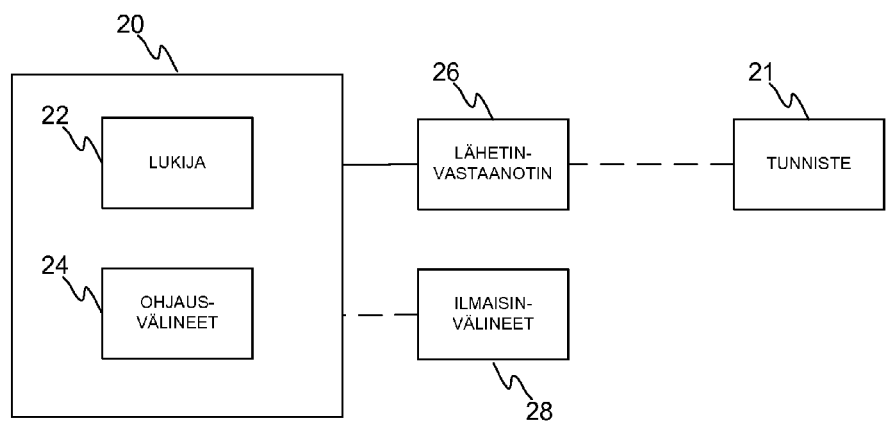
FIG. 2 shows a device according to a second example of the invention.

The portable device 20 shown in FIG. 2 in accordance with an example comprises a reader unit 22 and a control means 24 at least for controlling the operation of the reader unit 22 in a desired manner in relation to the object to be identified. The reader unit 22 is connected with a transceiver 26, such as an antenna, which communicates with the identifier 21 on the object to be identified. The transceiver 26, such as an antenna, may be connected e.g. through a cable with the reader unit 22 and communicates with the reader unit 22 in a manner known as such. The user can communicate with the control means 24 of the portable device 20. Furthermore, a separate device comprising detection means 28 is connected in a wireless or wired manner with the portable device 20, the separate device containing e.g. a sensor or sensor unit and being adapted to detect and indicate movement, position or distance. The detection means 28 generate and transmit information indicating movement or position. The control means 24 is adapted to receive command signals for controlling the operation of the reader unit 22 in relation to the object to be identified, wherein one or more of the command signals is/are based on the information indicating movement or position of the detection means 28 and/or the object to be identified.

The arrangement shown in FIG. 2 as an example comprises a portable device 20 and separate device or unit which comprises the detection means 28. In addition, the transceiver 26, such as an antenna, may be either integrated in the portable device 20 or a separate device or unit to be connected to the portable device 20, communicating with the reader unit 22 and an identifier 21 attached to the object to be identified or a transmitter or transceiver in the identifier 21 attached thereto. The portable device 20 which is shown as an example and contains a reader 22 may be a handheld terminal or it may be attached to the user's limb or body. The separate device or unit shown as an example and containing detection means 28 can be attached to the user's limb or elsewhere on the users body or it may be a handheld device. A handheld portable device (20) or terminal can naturally be placed on a table, rack or shelf without disturbing the operation of the device. An arrangement comprising a portable device 20, detection means 28 and an integrated or separate transceiver 26 can be implemented through any combination mentioned above. In an arrangement according to one example the portable device 20 may be a so-called belt reader which is attached to a belt and communicates in a desired manner with a wrist device, or so-called wrist detector, which is attached to the user's wrist and contains a detection means 28. In an arrangement according to another example the portable device 20 may be placed on a table, for instance, and it communicates in a desired manner with a wrist detector which is attached to one wrist and contains a detection means 28 and with a separate transceiver 26, such as an antenna, attached to the other or the same wrist.

The reader 22 in the portable device 20 according to the arrangement of FIG. 2 has functions and properties that are similar to those of the reader 12 of the portable device 10 shown in FIG. 1. The reader 12, 22 communicates in a known manner with an identifier 11, 21 attached to the object to be identified, said identifier containing an optical or RF transmitter or transceiver, for example, and said communication taking place through a transceiver 16, 26, such as an antenna, connected to the reader. The identifier 11, 21 may bear optical identification codes or storage capacity for storing the identification data of the object. The reader 12, 22 may be e.g. an optical code reader or a reader operating on one or more radio frequencies. Data communication between the reader 12, 22 and identifier 11, 21 may occur in both directions. The reader 12, 22 may be e.g. an RFID reader that communicates with a transmitter or transceiver in an RFID chip attached to or integrated in the identifier 11, 21 on one or more frequencies and using one or more communications protocols. An RFID antenna connected to the RFID reader may be integrated in the portable device 10, 20 or connected through a cable to an RFID reader in the portable device 10, 20.

A radio-frequency (RF) reader is capable of reading the RF signals transmitted by RF identifiers (antenna and transceiver circuit) of objects located within its reading range. The user can force the RF reader to read only certain desired RF signals of objects within its reading range, while at least one of the command signals received by the control means 14, 24 is/are based on information indicating movement or position of the detection means 18, 28 and/or the object to be identified. In inventory, collection and packaging processes as well as in distribution and other goods handling applications it is specifically important that the objects to be read can be selected as desired within the reading range.

Figure 3:
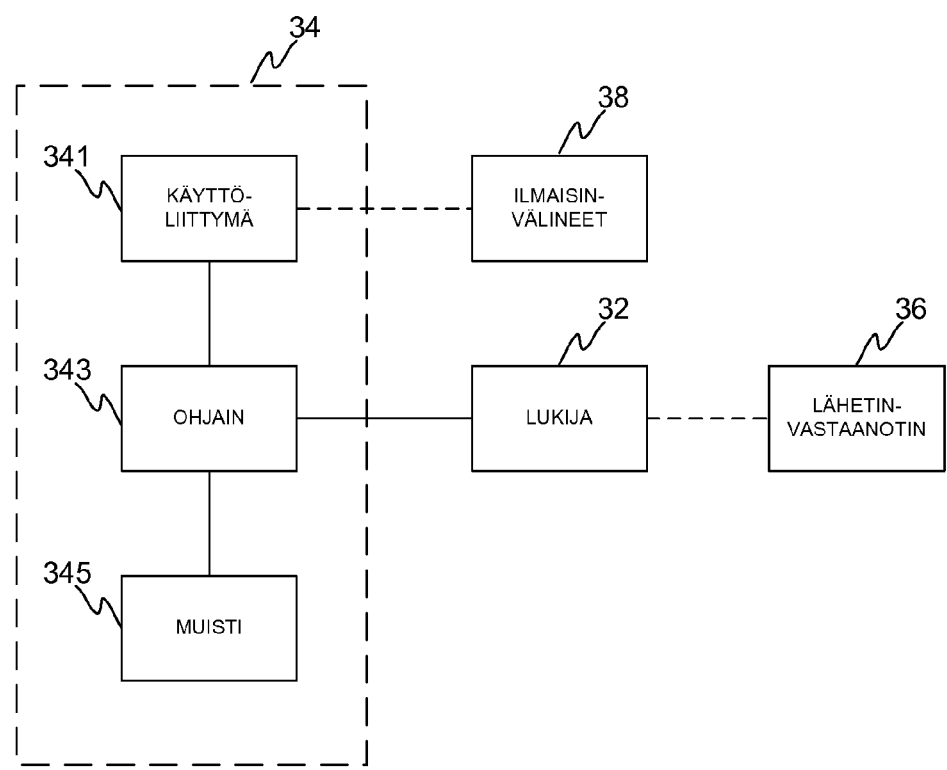
FIG. 3 shows an arrangement of devices according to examples of the invention.

FIG. 3 shows in more detail the control means 34 of a portable device 10, 20 according to an example and the connections of the reader 32 and detection means 38 with the control means 34. The reader 32 comprises known means to communicate data with a transceiver 36, such as an antenna, connected with it. The transceiver 36 communicates with an identifier 11, 21 on the object to be identified. The control means 34 is arranged to control at least the operation of the reader unit 32 in a desired manner in relation to the object to be identified. The control means 34 comprises at least a control unit 343, such as a processor, computer or other controller, and a memory 345 as well as a user interface 341 through which the user of the device can communicate with the other control means, such as the processor, and with the reader 32. The information associated with the identifier 11, 21 can be transferred via the controller 343 and user interface 341 to the user and/or via the controller 343 to some other location, such as e.g. system databases. The detection means 38, such as a sensor, detect and indicate movement, position or distance and generate information indicating movement or position of the detection means 38 and/or information indicating movement or position of the object to be identified. The control means 34, advantageously its user interface 341, is adapted to receive command signals for controlling the operation of the reader unit 32 in relation to the object to be identified, wherein one or more of the command signals is/are based on the information indicating movement or position of the detection means 38 and/or the object to be identified, which information is transmitted in a wireless or wired manner from the detection means 38. The user interface 341 of the control means 34 is adapted to receive, either wirelessly or through a cable connection, information indicating movement or position transmitted from the detection means 38. The reader 32 is arranged to communicate with the controller 343, which belongs to the control means 34, either wirelessly or in a wired manner through appropriate connection means. For example, the reader 32 receives from the controller 343 control commands to control the operation of the reader 32 in relation to the object to be identified, which control commands are at least in part based on information indicating movement or position received by the user interface 341, which information has been processed by the controller 343 in a desired manner so as to include it in the control commands. In some cases the controller 343 may be adapted to receive command signals directly from the detection means 38 e.g. when the information indicating movement or position transmitted from the detection means 38 is in digital format.

According to one example, the user interface 341 of the control means 34 comprises a switch device, receiver or a similarly functioning means which is switched on or off on the basis of a command signal indicating movement or position received from the detection means 38. As the switch device is switched on the user interface 341 transmits information indicating movement or position in the command signal to the controller 343 which then processes the control commands for the reader 32. The user interface 341 can also receive other command signals e.g. via a keyboard, touchscreen, handset, microphone or other similar data input or output means potentially included in the user interface. In addition, the user interface 341 may include e.g. a display, LEDs, loudspeaker or other means for indicating the status of the portable device 10, 20 and/or reader 32 in relation to the object to be identified, the reception of command and other signals. The means of indication may also be used e.g. to acknowledge a successful and/or completed action carried out by the reader 32 or a possible error.

According to one example, when the user interface 341 of the control means 34 has received from the detection means 38 a command signal based on information indicating movement or position, control commands are generated for the reader 32 by software stored in the memory 345 and executed in the controller 343, for example, so as to make the reader 32 to carry out a desired function in relation to the object to be identified. The reader 32 in the portable device 10, 20 may be e.g. in a standby or wait state by default so that the command signal will activate or switch on the actual operation of the reader 32 in relation to the object to be identified. Such actual operation of the reader 32 in relation to the object to be identified may comprise e.g. the reading, writing, locking or disabling one or more identifiers 11, 21 on the object or some other operation directed to an identifier 11, 21.

The reader 32 of a portable device 10, 20 according to one example stays in the operating state (operational in relation to the object to be identified) until the reader 32 issues an acknowledge for a successful operation in relation to the object and the indication means of the user interface 341 produces a corresponding visual or audible acknowledge indication. After the command signal (acknowledge from reader) received by the user interface 341 and acknowledge indication the reader 32 may remain in operating mode or return into wait or standby state, or if a certain period of time elapses after the reception by the user interface 341 of the command signal (acknowledge message) and acknowledge indication, during which time no new command signal based on information indicating movement or position is received, the reader 32 may return into wait or standby state, for example.

In the above-described examples the control means 34 and reader 32 are described as components of their own, but equally well all or some of the control means 34 may be integrated in the reader 32.

The detection means 18, 28, 38 comprises a sensor that detects movement, position or distance and generates information indicating absolute movement or position of the sensor. The detection means 18, 28, 38 may also comprise a sensor that detects movement, position and distance of the object to be identified, advantageously the movement, position and distance of the identifier 11, 21 on the object to be identified in relation to the sensor itself, whereby the sensor generates and transmits information indicating movement or position of the object to be identified relative to the sensor. A detection means 28, 38 implemented as a separate entity may also comprise a sensor which detects movement, position and distance of a reader device 22, 32, which is another separate entity, relative to the sensor, whereby the sensor generates and transmits information indicating movement or position of the reader device 22, 32 relative to the sensor. The detection means 18, 28, 38 may comprise a plurality of sensors some of which may detect movement, some position and some distance in the above-mentioned cases and some of which may be integrated in the portable device and some in the sensor unit which is a separate entity. For example, various acceleration sensors detect absolute or relative movement or distance, position sensors detect absolute or relative position, and distance or range sensors detect distance. Proximity sensors/switches, for instance, are used for detecting that an object to be read approaches from a certain direction or that it is at a certain distance from the sensor/switch.

A device 20 according to an example which is attachable to a limb or body comprises at least a detection means 28 to generate and transmit command signals whereby at least one of the command signals received by the control means 24 in a separate device is based on information indicating movement or position received from the detection means 28 and whereby said command signals control the operation of the reader 22 in relation to the object to be identified. A device 20 according to another example attachable to a limb or body comprises at least a reader 22 and control means 24 whereby at least one of the command signals received by the control means 24 is based on information indicating movement or position received from a detection means 28 located in a separate device and whereby said command signals control the operation of the reader 22 in relation to the object to be identified. A transceiver 26 can be integrated or connected in a wired manner in the latter device 20 in connection with the reader 22. The devices 20 mentioned in the examples above which are attachable to a limb or body communicate with each other in a wireless or wired manner as described above.

According to one example, the reader 12, 22, 32 of a portable device 10, 20 starts to carry out a predetermined operation in relation to the object to be identified when at least one command signal received by control means 14, 24, 34 is based on information indicating movement or position received from a detection means 18, 28, 38. Information indicating movement or position generated and transmitted by the detection means 18, 28, 38 is based e.g. on absolute movement or position of the detection means 18, 28, 38 itself or on relative movement or position of the detection means 18, 28, 38 relative to the object to be identified or a separate device 20 that contains a reader 22. According to one example, when the user lifts up in his hand a product to be identified, a detection means 18 in the device 10 detects this movement or position and a control means 14 receives a command signal containing information indicating the movement or position, whereby the control means 14 activates the reader 12, 22, 32 so as to carry out a predetermined operation in relation to the object to be identified as described above. According to another example, when the user lifts up in his hand a product to be identified, a separate belt device containing a detection means 28 detects this movement or position and a control means 24 in the portable device 20 receives a command signal containing information indicating this movement or position, whereby the control means 24 activates the reader 12, 22, 32 so as to carry out a predetermined operation in relation to the object to be identified as described above. The reader 12, 22, 32 issues a notification of a successful operation e.g. through the user interface 341. According to the above examples, operation of the reader 12, 22, 32 starts automatically when the user is collecting products into a box in a storage, for example, whereby the reading of an identifier 11, 21 placed on the product does not require any separate action of the user, which speeds up the collection and packing process.

An arrangement according to one example comprises a portable device 20, which can be placed on a table, held in hand or attached to a belt, for instance, and contains at least a reader 22 and control means 24 as well as a separate device or unit comprising a detection means 28 which is attached to the user's wrist, for example. According to one example, when the user swings the wrist device that is attached to his wrist and contains a detection means 28, the control means 24 of the portable device 20, such as a belt reader, receives information indicating the movement or position of the wrist device and activates the reader 12, 22, 32 so as to carry out a predetermined operation in relation to the object to be identified as described above. The reader 12, 22, 32 issues a notification of a successful operation e.g. through the user interface 341. The user can thus control the operation of the reader 12, 22, 32 just by waving his hand; any actions more complex than that are not needed.

Figure 4:
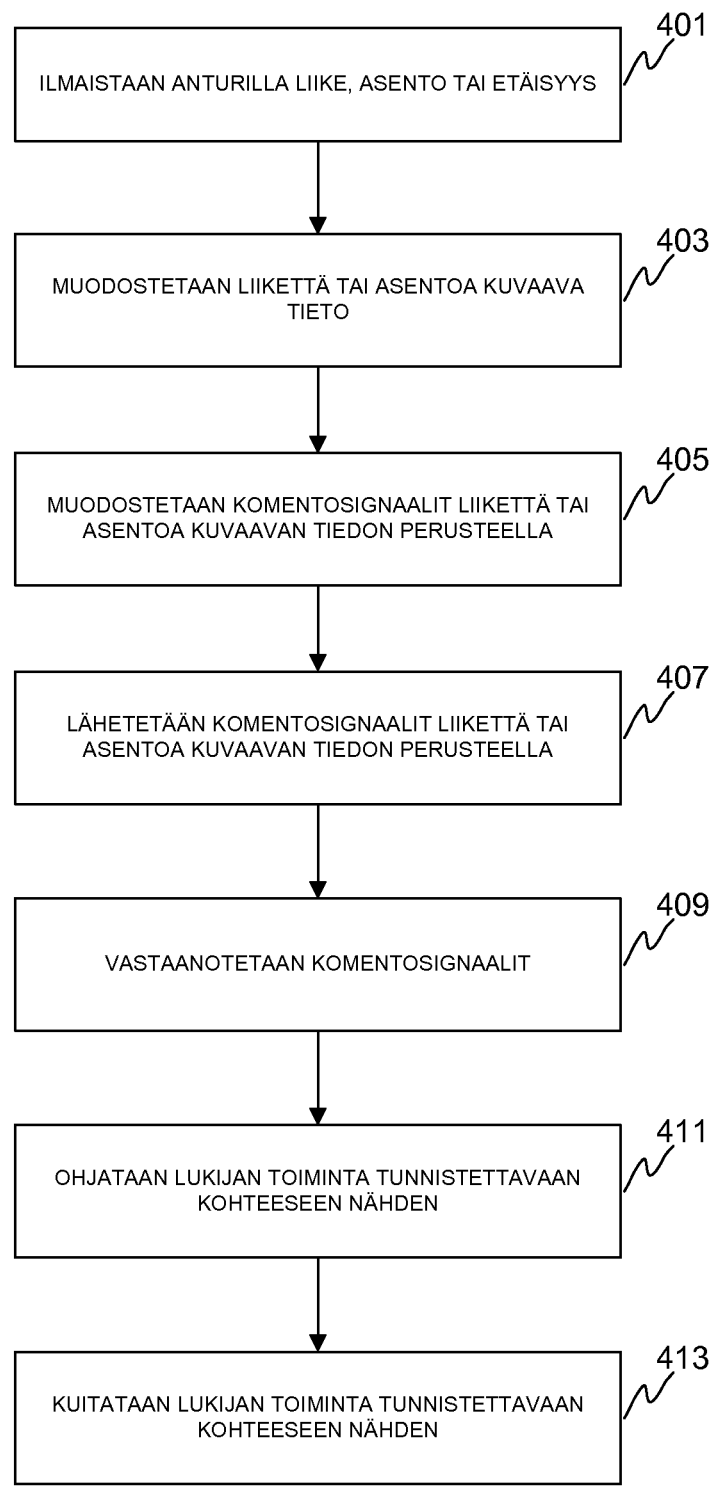
FIG. 4 shows a method according to an example of the invention.

A method shown in FIG. 4 for controlling the reader 12, 22, 32 according to one example comprises a step 401 in which the detection means 18, 28, 38 detect and indicate movement, position or distance and a step 403 in which they generate information indicating movement or position of the detection means 18, 28, 38 and/or information indicating movement or position of the object to be identified. Command signals are generated in step 405 based at least partly on the information indicating movement or position. In step 407 command signals are transmitted or transferred, wherein all or some of the command signals are based on information indicating movement or position of the detection means 18, 28, 38 or the object to be identified. In step 409 command signals are received, whereby the reader 12, 22, 32 which is e.g. in standby or wait state by default, is activated, and in step 411 at least one of the command signals is used to control the operation of the reader 12, 22, 32 in relation to the object to be identified. In step 413 the successful operation carried out by the reader 12, 22, 32 in relation to the object to be identified is acknowledged.

In step 411 at least one of the following operations in relation to the object to be identified can be carried out: read from one or more identifiers 11, 21 on the object, write to one or more identifiers 11, 21 on the object, lock one or more identifiers 11, 21 on the object, disable one or more identifiers 11, 21 on the object, or direct some other operation to one or more identifiers 11, 21 on the object.

It is obvious to a person skilled in the art that various embodiments of the invention are not limited to the examples described here but can vary according to the claims attached hereto.

The invention claimed is:

1. A portable device comprising:
a control means (14, 24, 34) for receiving command signals,
a reader (12, 22, 32), the operation of the reader in relation to an object is controlled by said command signals, and
a detection means (18, 28, 38) for detecting distance, said control means (14, 24, 34) being connected to the detection means (18, 28, 38) for detecting a distance of the object in relation to the detection means (18, 28, 38),
whereby at least one command signal received by said control means (14, 24, 34), from the detection means (18, 28, 38), is based on information which indicates a relative movement of the detection means (18, 28, 38) relative to the object based on the detected distance of the object in relation to the detection means (18, 28, 38), in response to the command signal said control means is configured to activate the operation of the reader.

2. A device according to claim 1, wherein the command signal received by the control means (14, 24, 34) is based on information indicating movement or position of the detection means (18, 28, 38) relative to the reader (12, 22, 32).

3. A device according to claim 2, wherein the control means (14, 24, 34) comprises a user interface (341) for receiving command signals, controller (343) adapted to control the operation of the reader on the basis of command signals received by the user interface, memory (345) for storing control software, whereby the controller (343) uses a command signal, which is received by the user interface (341) and contains information indicating movement or position obtained from a detection means (18, 28, 38), to generate control signals for the reader (12, 22, 32) with the help of control software.

4. A device according to claim 1, wherein the control means (14, 24, 34) comprises a user interface (341) for receiving command signals, controller (343) adapted to control the operation of the reader on the basis of command signals received by the user interface, memory (345) for storing control software, whereby the controller (343) uses a command signal, which is received by the user interface (341) and contains information indicating movement or position obtained from a detection means (18, 28, 38), to generate control signals for the reader (12, 22, 32) with the help of control software.

5. A device according to claim 1, wherein the reader (12, 22, 32) remains in operating state if after a received command signal an operation directed to the object to be identified is successfully carried out, or wherein the reader (12, 22, 32) returns to a wait or standby state if after a received command signal an operation directed to the object to be identified is successfully carried out and a certain predetermined period of time elapses during which no new command signal is received.

6. A device according to claim 1, wherein the control means (14, 24, 34) comprises a microphone or other sound-receiving component, whereby at least one command signal received by the control means (14, 24, 34) is based on received sound.

7. A device according to claim 1, wherein the device is a device to be held in the user's hand, a device to be attached to the user's wrist, or a device to be attached onto the user's waist.

8. A device according to claim 1, wherein the detection means (18, 38) are integrated in the portable device (10).

9. A device according to claim 1, which comprises a separate unit containing a detection means (28, 38) and a portable device (20) containing at least a reader (22, 32) and control means (24, 34), whereby the detection means (28, 38) is connected to a control means (14, 24, 34) in a wired or wireless manner.

10. A device according to claim 1, wherein the reader (12, 22, 32) is connected to a transceiver means (16, 26, 36) for transmitting to the identifiers (11, 21) signals related to the identifiers (11, 21) and for receiving them from the identifiers (11, 21), whereby each of the objects to be identified contains at least one identifier (11, 21).

11. A device according to claim 1, wherein the reader (12, 22, 32) is an optical reader or a reader operating at least on one radio frequency, and the identifiers (11, 21) are identifiers that can be optically interpreted or identifiers operating on at least one radio frequency, whereby the transceiver means (16, 26, 36) and identifiers (11, 21) communicate using at least one optical or RF communications protocol.

12. A device according to claim 1, wherein the operation of the reader (12, 22, 32) in relation to the object to be identified is at least one of the following: reading, writing, locking or disabling one or more identifiers (11, 21) on the object or some other action directed to an identifier (11, 21).

13. A device according to claim 1, wherein the at least one command signal received by said control means (14, 24, 34), from the detection means (18, 28, 38), is based on information which indicates movement of the detection means (18, 28, 38) in relation to the object based on the detected distance of the object in relation to the detection means (18, 28, 38).

14. A device according to claim 1, wherein the at least one command signal received by said control means (14, 24, 34), from the detection means (18, 28, 38), is based on information which indicates position of the detection means (18, 28, 38) in relation to the object based on the detected distance of the object in relation to the detection means (18, 28, 38).

15. An arrangement of a device attachable to a limb or body comprising:
at least a detection means (18, 28, 38) configured to detect a distance of an object to be identified in relation to the detection means (18, 28, 38), to generate command signals and transmit the generated command signals to a control means (14, 24, 34), and
another device (20) comprising at least a reader (12, 22, 32) and a control means (14, 24, 34),
whereby at least one of the command signals received by the control means (14, 24, 34) is based on information, which indicates a relative movement or position of the detection means (18, 28, 38) relative to the object based on the detected distance of the object in relation to the detection means (18, 28, 38), received from the detection means (18, 28, 38) and
whereby the command signals control the operation of the reader (12, 22, 32) in relation to the object, in response to the command signal said control means is configured to activate the operation of the reader.

16. An arrangement according to claim 15, wherein the command signal received by the control means (14, 24, 34) is based on information indicating the movement or position of the detection means (18, 28, 38) relative to the reader (12, 22, 32).

17. An arrangement according to claim 15, wherein the at least one of the command signals received by the control means (14, 24, 34) is based on information which indicates movement of the detection means (18, 28, 38) in relation to the object based on the detected distance of the object in relation to the detection means (18, 28, 38) and received from the detection means (18, 28, 38).

18. A method for controlling a portable reader that comprises i) a control means for receiving at least one command signal, ii) a reader, and iii) a detection means, the method comprising:
detecting (401), by the detection means, a distance of an object to be identified in relation to the detection means,
receiving (403), by the control means, at least one command signal, from the detection means, indicating a relative movement of the detection means relative to the object based on the detected distance of the object in relation to the detection means, generating (405, 407, 409) at least one command signal based at least in part on the received information, and controlling (411), by the control means, through the at least one of the command signal, operation of the reader in relation to the object by activating the operation of the reader in response to the said command signal.

19. A method according to claim 18, comprising steps in which at least one of the following actions is carried out in relation to the object to be identified: read from one or more identifiers on the object, write to one or more identifiers on the object, lock one or more identifiers on the object, disable one or more identifiers on the object, or direct some other operation to one or more identifiers on the object.

20. A method according to claim 18, in the receiving step (403), the at least one command signal received from the detection means, indicates the movement of the detection means in relation to the object based on information the detected distance of the object in relation to the detection means.

* * * * *